United States Patent [19]
Hachtel et al.

[11] Patent Number: 5,210,491
[45] Date of Patent: May 11, 1993

[54] MEASURING DEVICE FOR THE CONTACTLESS DETERMINATION OF A CHANGE IN LINEAR TRAVEL AND/OR ANGLE OF ROTATION WITH FIXABLE PLACE OF HIGHEST MEASUREMENT ACCURACY AND SMALLEST DRIFT ERRORS

[75] Inventors: Hansjörg Hachtel, Weissach; Klaus Dobler, Gerlingen, both of Fed. Rep. of Germany

[73] Assignee: Robert Bosch GmbH, Stuttgart, Fed. Rep. of Germany

[21] Appl. No.: 602,333
[22] PCT Filed: Jul. 11, 1989
[86] PCT No.: PCT/DE89/00458
 § 371 Date: Dec. 3, 1990
 § 102(e) Date: Dec. 3, 1990
[87] PCT Pub. No.: WO90/01140
 PCT Pub. Date: Feb. 8, 1990

[30] Foreign Application Priority Data
 Jul. 20, 1988 [DE] Fed. Rep. of Germany ....... 3824534

[51] Int. Cl.$^5$ .................. G01B 7/14; G01R 27/26
[52] U.S. Cl. ................ 324/207.19; 324/207.12; 324/661

[58] Field of Search .......... 324/207.11, 207.12, 324/207.13, 207.16, 207.18, 207.19, 207.22, 207.24, 207.25, 661, 662; 340/870.31, 870.35, 870.37

[56] References Cited
U.S. PATENT DOCUMENTS
4,833,919 5/1989 Saito et al. .............. 324/207.24

FOREIGN PATENT DOCUMENTS
1226037 4/1987 U.S.S.R. ................ 324/207.25

Primary Examiner—Walter E. Snow
Attorney, Agent, or Firm—Michael J. Striker

[57] ABSTRACT

A measuring device for contactless determination of a change in a linear travel or angle of rotation includes two bodies movable relative to one another, and at least two electrical elements arranged on one of the two bodies and connected in at least one electrical bridge circuit. Electrical characteristic values of the two electrical elements vary in accordance with relative change assigned areas of the other of the two bodies. The two electrical elements have different electrical measurement sensitivities for fixing a place with a highest measurement accuracy and smallest drift errors within a measurement area of the measuring device.

10 Claims, 2 Drawing Sheets

MEASURING DEVICE FOR THE CONTACTLESS DETERMINATION OF A CHANGE IN LINEAR TRAVEL AND/OR ANGLE OF ROTATION WITH FIXABLE PLACE OF HIGHEST MEASUREMENT ACCURACY AND SMALLEST DRIFT ERRORS

PRIOR ART

The invention relates to a measuring device comprising two bodies movable relative each other, and two coils arranged on one of the bodies and connected in at least one electrical bridge circuit. The other body has areas of electrically conductive and/or ferromagnetic material assigned to the coils. Respective alternating current resistance of the coils varies in accordance with relative change in magnitude of these areas. In known measuring devices, two identical coils are arranged on a body in a mirror symmetry. A disk is arranged parallel to this body and is connected with a structural component part whose rotational movement is to be measured. In the initial position, the electrically conducting surface of the disk overlaps the two coils by half, the same amounts of coil voltage can be formed in both coils. The measurement area with the greatest accuracy and smallest drift is located in the region of small angles in the proximity of the initial position. However, the measurement area itself is relatively greatly restricted. Only a relatively small symmetrical measurement area to the zero point is possible.

SUMMARY OF THE INVENTION

The object of the invention is a measuring device, in which the measuring point with the highest measuring accuracy and the smallest drift can be fixed as desired within a relatively large area. The object of the invention is achieved by providing coils having different electrical measurement sensitivities which permit to fix the place with the highest measurement accuracy and the smallest drift errors within the measurement area of the measurement device.

In particular, in a large linear measurement area, the measurement area with the highest measurement accuracy is located at small angles and the measurement area with relatively tolerance range is located at large measurement angles. Further, measurement errors caused by environmental influences or axial and radial play can be virtually completely eliminated at the desired point in the measurement area. The measuring device is constructed a particularly simple manner and can be adapted relatively easily to the desired instances of application. It is possible to eliminate virtually all errors at the desired place in the measurement area, such as fluctuations of the carrier voltage and/or the carrier frequency, carrier change in the coil quality due to increase in the surrounding temperature, etc.

The present invention both as to its construction so to its method of operation, together with additional objects and advantages thereof, will be best understood from the following detailed description of the preferred embodiments when read with reference to the accompanying drawings.

DESCRIPTION OF THE PREFERRED EMBODIMENTS

Figure 1:
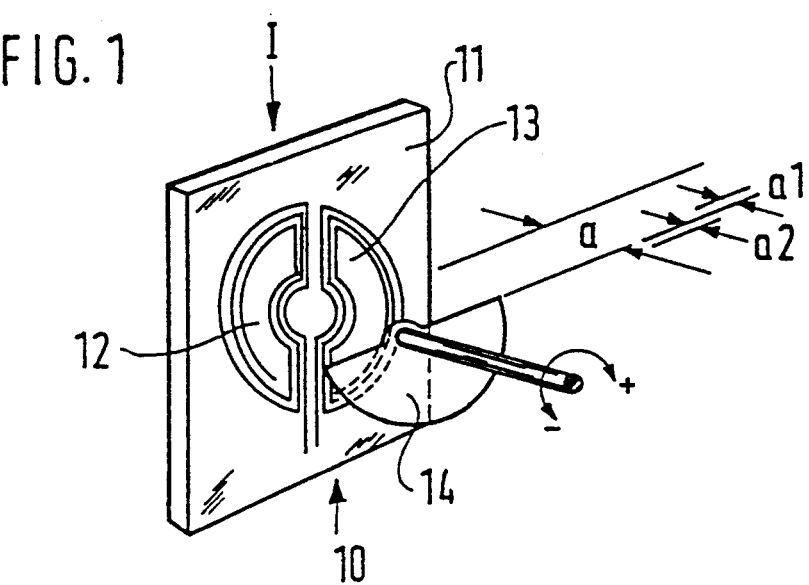
FIG. 1 shows a perspective view of a measuring device according to the prior art.

A sensor for measuring angles, which is known according to the prior art, is designated by 10 in FIG. 1. Two identical coils 12, 13 are fastened in mirror symmetry on a carrier 11 and are connected in a Wheatstone half-bridge. A semicircular disk 14 is arranged at a distance "a" from the carrier 11 and is connected with a structural component part, not shown, whose rotational movement is to be determined. The surface of the disk 14 facing the coils comprises an electrically conducting and/or ferromagnetic layer. The sensor 10 works according to the inductive or eddy current measuring principle. In the basic position of the disk 14, the two coils 12, 13 are equally overlapped in each instance by the disc, i.e., and, in the eddy current measuring method, eddy currents of equal magnitude are formed in both coils 12, 13. In the eddy current measuring principle, a high-frequency alternating current flows through the coils. The disk 14 is rotated in accordance with the movement of the structural component part for the purpose of measurement. A magnetic alternating field is formed at the coils 12, 13 which causes eddy currents on the metallic surface of the disk 14. The greater the surface of the disk 14 is penetrated by the magnetic field, the more eddy currents are produced. Further, the magnitude of the generated eddy currents depends on the material utilized for the disk 14, particularly its surface, as well as on the distance of the coils 12, 13 from the surface of the disk 14. The alternating current resistance of the coils is reduced by the generated eddy currents, which—with corresponding electrical connection—causes a reduction of the voltage across the coils. During the rotational movement of the disk 14, the magnitude of the surface of the disk 14 assigned to the respective coils is changed. The surface of the disk 14 assigned to the coil 12, for example, is accordingly increased by the same amount as it is reduced in the other coil 13, and vice versa. The two coils 12, 13 are connected in a Wheatstone half-bridge in such a way that the difference in the amounts of voltage of the two coils serves as a measurement signal. Accordingly, a measurement signal is obtained which is virtually proportional to the respective rotation of the disk 14.

In a rotating area of approximately ±60° as seen in the two rotating directions relative to the initial position, the course of the measurement curve is virtually linear. The distance "a" to the coils 12, 13 can be changed by axial movement of the disk 14, e.g., by bearing clearance, so that the measurement signal is falsified.

Figure 2:
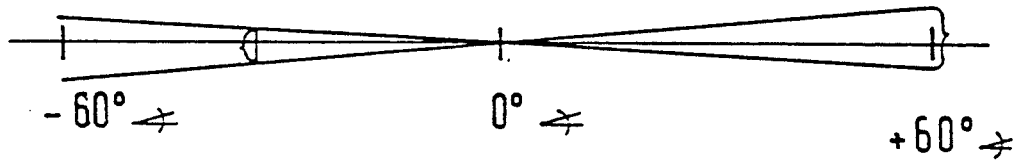
FIG. 2 shows a measurement diagram.

FIG. 2 shows a diagram which illustrates the magnitude of the measurement error along an angle of rotation of −60° to +60°. In this case, the measurement error V caused by the change in the distance "a" is plotted over the magnitude of the angle of rotation. The curve designated by I shows the measurement error when the distance is enlarged, and the curve designated by II shows the measurement error when the distance is reduced. The greatest measurement error also occurs in the area of the large angle of rotation, e.g. −60°. In the area of the initial position, i.e., in the area of 0° or of small angles of rotation, the measurement error caused by drifts or tolerances is smallest. The measurement error is tolerable in comparison to the magnitude of the turning angle. If measurement is effected from −60° to +60°, as in the prior art, a measurement area of approximately 120° would be obtained, but the greatest measurement error would also be at the beginning of the measurement process in this case in the area at −60° or at small turning angles. The middle area at approximately 60° would then have the area with the highest measuring accuracy.

Figure 3:
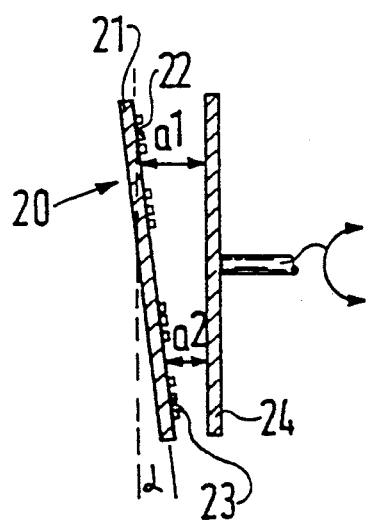
FIGS. 3 and 5 each show a longitudinal cross-sectional view of a measuring device, according to the invention.

FIG. 3 shows a measuring device, according to the invention, in which the area of highest measuring accuracy is located, in spite of the relatively large measurement area, at small turning angles around the desired point of the measurement area. The longitudinal cross-section corresponds to a view in direction I in FIG. 1. The sensor 20 likewise comprises a carrier 21, two extensively identical coils 22, 23 being arranged on the half-surfaces of the latter in a mirror symmetry. The carrier 21 of electrically nonconductive material is arranged so as to be inclined at an angle α relative to the disk 24. The disk 24 again comprises electrically conductive material in accordance with the eddy current measuring principle.

Due to the inclined position of the carrier 21, the place in the measurement area where there is the highest measuring accuracy is shifted from the middle position (0°). With the sensor 10, according to the prior art, the attempt is made to adapt the geometrical relations of symmetry, i.e. the parallel arrangement of the coils 12, 13 relative to the disk 14, and the electrical relations of symmetry to one another in such a way that the same amount of voltage occurs in both coils 12, 13 when the disk 14 overlaps the latter in each instance by half. In contrast to this, the above two symmetrical relationships diverge from one another in the sensor 20, according to the invention. The inclined position of the carrier 21 causes the mean distance between the coil 22 and the disk 24 to diverge from the mean distance between the coil 23 and the disk 24. The different distances $a_1$ and $a_2$ of the coils 22 and 23, respectively, from the disk 24 cause a different magnitude of eddy currents to be produced in each of the two coils. The smaller eddy current formation on the disk 24 caused by the greater distance $a_1$ between the coil 22 and the disk 24 must be compensated for by a greater overlapping surface of the coil by the disk 24. Accordingly, the area of greatest measurement accuracy lies at a point in the measurement area, e.g. −20°, in the measurement area now present. The situation of the point with the greatest measuring accuracy depends on the magnitude of the angle α of inclination of the carrier 21. Further, the measurement voltage tapped at the Wheatstone half-bridge circuit is zero in the area of highest accuracy. The errors brought about by environmental influences, e.g. change in the coil quality due to a change in the surrounding temperature, etc., as well as errors caused by mechanical axial bearing clearance, are eliminated at this point in the measurement area.

Of course, it is also possible to arrange the disk 24 in the inclined position instead of the carrier 21, so that the carrier 21 is vertical and the disk is arranged at an angle relative to it.

Figure 4:
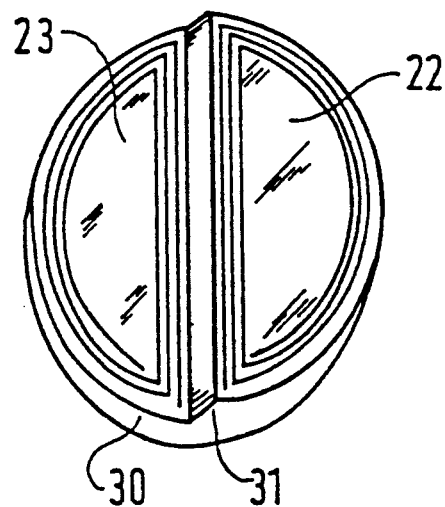
FIG. 4 shows a perspective view of a modification of the embodiment according to FIG. 3.

FIG. 4 shows a modification of the embodiment according to FIG. 3. In order to achieve varying magnitudes of eddy current formation through the two coils with identical overlapping surface by the disk 24, one of the coils 22 must be arranged on a raised portion 31 of the carrier 30. Accordingly, a different distance between the coils 22, 23 and the disk 24 is effected again.

Figure 5:
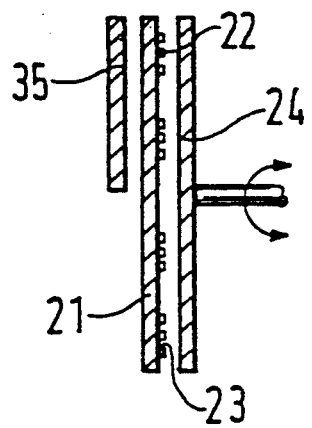

In the sensor according to FIG. 5, the parallel arrangement of the carrier 21 of the coils 22, 23 relative to the disk 24 can be maintained. In order to achieve differing eddy current formation of the two coils 22, 23 on the measuring disk, a material comprising electrically conductive material is arranged on the side of the carrier 21 remote of the disk 24. As a result, the eddy currents produced in the coil 22 diverge from those in the other coil 23, although the same distance remains between the coil surface and the disk 24. In so doing, the disk 24 covers half the coil in each instance.

In order to achieve a shifting of the location of highest accuracy within the measurement area it is necessary, according to the invention, to damp the two coils differently, i.e. to produce a differing eddy current in the two coils in mechanical symmetrical position. In addition to the modifications according to FIGS. 3 to 5, the coils can have different coil diameters or different coil inductances or coil quality. Further, it is also possible to work with four coils instead of with two coils, the four coils being connected in a Wheatstone full-bridge in a. Instead of the described eddy current principle, the inductive measuring method can also be applied. In so doing, only the disk 14 or 24 need be produced from ferromagnetic material.

Figure 6:
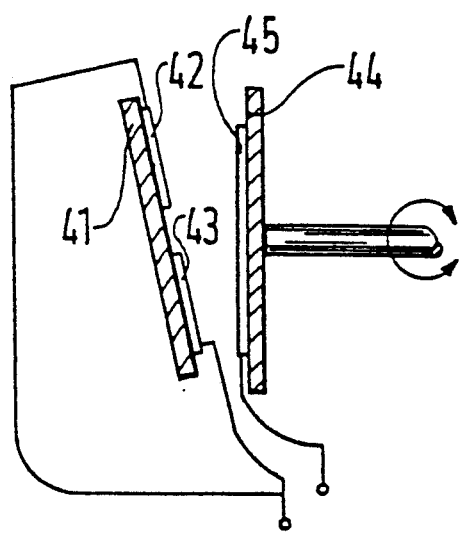
FIG. 6 shows a cross-sectional view a modification of the measuring device for a capacitive measurement.

It is also possible to operate the sensor according to the capacitance principle. As shown in FIG. 6, two extensively identical, mirror-symmetrical surface areas 42, 43 of metallic material are arranged on a carrier 41 arranged in an inclined position. These areas 42, 43 are in a working connection with a metallic layer 45 applied to a disk 44. The areas 42, 43 and the layer 45 form the respective capacitor plates. During the semicircular rotating movement of the disk 44, the magnitude of the overlapping capacitor plates 42, 43, 44 is changed and a measurement signal is accordingly produced which is proportional to the rotational movement.

Figure 7:
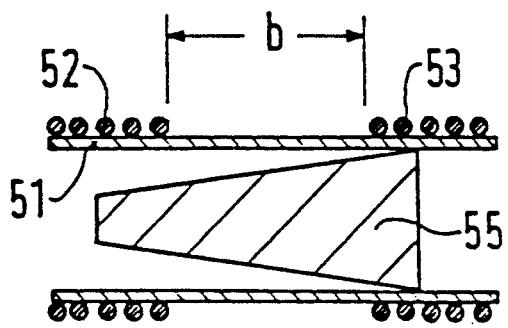
FIG. 7 shows a cross-sectional view of a modification for linear travel measurement.

The measurement method described above for determining the angle of rotation can also be modified for linear travel measurement, as is shown in FIG. 7. Two extensively identical coils 52, 53 are arranged on a tubular coil carrier 51 at a distance "b" from one another. In the interior of the coils, a conical body 55 comprising electrically conductive and/or ferromagnetic material is displaced axially and accordingly relative to the coils 52, 53. Since the distance of the surface of the body 55 from the coil assigned to it is different, a different magnitude of eddy current formation is effected in the coils 52, 53. But the manner of operation corresponds in other respects to the determination of the angle of rotation described above.

While the invention has been illustrated and described as embodied in a device for controlling determination of a change in a linear travel and/or angle of rotation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A measuring device for contactless determination of a change in at least one of linear travel and angle of rotation, comprising two bodies movable relative to one another; and at least two coils arranged on one of said two bodies and connected in at least one electrical bridge circuit, the other of said two bodies including areas formed of at least one of electrically conductive material and ferromagnetic material assigned to said coils, respective alternating current resistance values of said coils varying in accordance with relative change in a magnitude of respective assigned areas of said other of said bodies, and said coils being arranged so that different eddy current formation of said coils are obtained and therefore said coils have different electrical measurement sensitivities for fixing a place with a highest measurement accuracy and samllest drift errors to be adapted to desired applications of said measuring device.

2. A measuring device as set forth in claim 1, wherein said one of two bodies is tubular, and the other of said two bodies is conical.

3. A measuring device for contactless determination of a change in at least one of linear travel and angle of rotation, comprising two bodies movable relative to one another; and at least two capacitors arranged on one of said two bodies and connected in at least one electrical bridge circuit, respective capacitance values of said capacitors varying in accordance with relative change in said other of said bodies, and said capacitors being arranged so that different capacities of said capacitors are obtained and therefore said capacitors have different electrical measurement sensitivities for fixing a place with a highest measurement accuracy and smallest drift errors within a measurement area of said measuring device to be adapted to desired applications.

4. A measuring device for contactless determination of a change in at least one of linear travel and angle of rotation, comprising two bodies movable relative to one another; and at least two electrical elements arranged on one of said two bodies and connected in at least one electrical bridge circuit, the other of said two bodies having areas assigned to said at least two electrical elements, electrical characteristic values of said electrical elements varying in accordance with relative change in assigned areas of said other of said bodies, and said electrical elements being arranged so that different eddy current formations of said electrical elements are obtained and therefore said electrical elements have different electrical measurement sensitivities for fixing a place with a highest measurement accuracy and smallest drift errors within a measurement area of said measuring device to be adapted to desired applications.

5. A measuring device for contactless determination of a change in at least one of linear travel and angle of rotation, comprising two bodies movable relative to one another; and at least two coils arranged on one of said two bodies and connected in at least one electrical bridge circuit, the other of said two bodies including areas formed of at least one of electrically conductive material and ferromagnetic material assigned to said coils, respective alternating current resistance values of said coils varying in accordance with relative change in a magnitude of respective assigned areas of said other of said bodies, and said coils being arranged so that different eddy current formations of said coils are obtained and therefore said coils have different electrical measurement sensitivities for fixing a place with a highest measurement accuracy and smallest drift errors to be adapted to desired applications of said measuring device, at least one of said two bodies being inclined at an angle to a plane extending perpendicular to an axis of rotation of said two bodies.

6. A measuring device for contactless determination of a change in at least one of linear travel and angle of rotation, comprising two bodies movable relative to one another; and at least two coils arranged on one of said two bodies and connected in at least one electrical bridge circuit, the other of said two bodies including areas formed of at least one of electrically conductive material and ferromagnetic material assigned to said coils, respective alternating current resistance values of said coils varying in accordance with relative change in a magnitude of respective assigned areas of said other of said bodies, and said coils being arranged so that different eddy current formations of said coils are obtained and therefore said coils have different electrical measurement sensitivities for fixing a place with a highest measurement accuracy and smallest drift errors to be adapted to desired applications of said measuring device, a distance of one of said two coils from the other of said two bodies being greater than a distance of the other of said coils from the other of said bodies.

7. A measuring device for contactless determination of a change in at least one of linear travel and angle of rotation, comprising two bodies movable relative to one another; and at least two coils arranged on one of said two bodies and connected in at least one electrical bridge circuit, the other of said two bodies including areas formed of at least one of electrically conductive material and ferromagnetic material assigned to said coils, respective alternating current resistance values of said coils varying in accordance with relative change in a magnitude of respective assigned areas of said other of said bodies, and said coils being arranged so that different eddy current formations of said coils are obtained and therefore said coils have different electrical measurement sensitivities for fixing a place with a highest measurement accuracy and smallest drift errors to be adapted to desired applications of said measuring device; further comprising a third body comprising electrically conductive material and assigned to one of said coils.

8. A measuring device for contactless determination of a change in at least one of linear travel and angle of rotation, comprising two bodies movable relative to one another; and at least two coils arranged on one of said two bodies and connected in at least one electrical bridge circuit, the other of said two bodies including areas formed of at least one of electrically conductive material and ferromagnetic material assigned to said coils, respective alternating current resistance values of said coils varying in accordance with relative change in a magnitude of respective assigned areas of said other of said bodies, and said coils being arranged so that different eddy current formations of said coils are obtained and therefore said coils have different electrical measurement sensitivities for fixing a place with a highest measurement accuracy and smallest drift errors to be adapted to desired applications of said measuring device, said one of said two bodies being tubular, and the other of said two bodies being conical.

9. A measuring device for contactless determination of a change in at least one of linear travel and angle of rotation, comprising two bodies movable relative to one another; and at least two coils arranged on one of said two bodies and connected in at least one electrical bridge circuit, respective capacitance values of said capacitors varying in accordance with relative change in said other of said bodies, and said capacitors being arranged so that different capacities of said capacitors are obtained and therefore said capacitors have different electrical measurement sensitivities for fixing a place with a highest measurement accuracy and smallest drift errors within a measurement area of said measuring device to be adapted to desired applications, at least one of said two bodies being inclined at an angle to a plane extending perpendicular to an axis of rotation of said two bodies adapted to desired applications of said measuring device, at least one of said two bodies being inclined at an angle to a plane extending perpendicular to an axis of rotation of said two bodies.

10. A measuring device for contactless determination of a change in at least one of linear travel and angle of rotation, comprising two bodies movable relative to one another; and at least two coils arranged on one of said two bodies and connected in at least one electrical bridge circuit, respective capacitance values of said capacitors varying in accordance with relative change in said other of said bodies, and said capacitors being arranged so that different capacities of said capacitors are obtained and therefore said capacitors have different electrical measurement sensitivities for fixing a place with a highest measurement accuracy and smallest drift errors within a measurement area of said measuring device to be adapted to desired applications, a distance of one of said capacitors from the other of said two bodies being greater than a distance of the other of said two capacitors from the other of said two bodies.

* * * * *